United States Patent [19]

Ireland

[11] 4,058,657
[45] Nov. 15, 1977

[54] CO-CURED COMPOSITIONS OF AMINE-TERMINATED LIQUID POLYMERS AND VINYLIDENE-TERMINATED POLYMERS AND PROCESS FOR PREPARATION THEREOF

[75] Inventor: Robert William Ireland, Avon Lake, Ohio

[73] Assignee: The B. F. Goodrich Company, Akron, Ohio

[21] Appl. No.: 599,990

[22] Filed: July 29, 1975

Related U.S. Application Data

[63] Continuation-in-part of Ser. No. 593,673, July 7, 1975, abandoned.

[51] Int. Cl.$^2$ .............. C08F 26/08; C08F 126/06; C08F 26/00; C08L 63/00
[52] U.S. Cl. .............. 526/263; 260/31.2 N; 260/31.8 E; 260/31.8 Z; 260/31.8 DR; 260/47 VA; 260/79.5 C; 260/268 PL; 260/290 V; 260/293.63; 260/836; 260/837 R; 260/878 R; 260/879; 260/880 R; 526/23; 526/49; 526/50; 526/265; 526/272; 526/338
[58] Field of Search .............. 526/23, 49, 50, 56, 526/263, 265, 338; 260/79.3 M, 79.5 C, 290 V, 293.63, 268 PL

[56] References Cited

U.S. PATENT DOCUMENTS

| | | | |
|---|---|---|---|
| 2,727,021 | 12/1955 | Price | 526/263 |
| 2,844,632 | 7/1958 | Yen | 260/608 |
| 3,172,856 | 3/1965 | Quist et al. | 526/263 |
| 3,285,949 | 11/1966 | Siebert | 260/465.4 |
| 3,356,655 | 12/1967 | Sekmanas | 526/263 |
| 3,551,472 | 12/1970 | Siebert | 260/465.4 |
| 3,652,520 | 3/1972 | Ryan et al. | 526/56 |
| 3,845,056 | 10/1974 | Robson et al. | 260/268 PL |
| 3,919,143 | 11/1975 | Morris | 526/50 |
| 3,953,348 | 4/1976 | Lee | 526/50 |
| 3,960,865 | 6/1976 | Culbertson | 260/268 |

*Primary Examiner*—Herbert J. Lilling
*Attorney, Agent, or Firm*—Charles A. Crehore

[57] ABSTRACT

Co-cured compositions are prepared readily by mixing (1) 100 parts by weight of at least one amine-terminated liquid polymer having a carbon-carbon backbone and (2) from about 80 to about 120 parts by weight of at least one vinylidene-terminated polymer having a carbon-carbon, polyether or polysulfide polymeric backbone. The compositions undergo a soft cure readily at room temperature without addition of catalysts or crosslinking agents. The compositions are useful as caulks, sealants and potting compounds.

12 Claims, No Drawings

CO-CURED COMPOSITIONS OF AMINE-TERMINATED LIQUID POLYMERS AND VINYLIDENE-TERMINATED POLYMERS AND PROCESS FOR PREPARATION THEREOF

CROSS REFERENCE TO RELATED APPLICATION

This is a continuation-in-part of my copending application Ser. No. 593,673 filed July 7, 1975, and now abandoned.

BACKGROUND OF THE INVENTION

Vinylidene-terminated polydienes are known in the art. For example, U.S. Pat. No. 3,652,520 teaches preparation of polymerizable polydiene ethylenically-unsaturated esters having at least about one terminal ethylenically unsaturated acyloxy group by esterifying intermediate polyhydroxy polydienes with an unsaturated acyl compound. The vinylidene-terminated polydienes can be used together with certain other materials (e.g., reactive vinyl comonomers as taught by U.S. Pat. No. 3,652,520) as caulks, sealants, or the like, but addition of catalyst and/or crosslinking agents is generally required. An example of a known vinylidene-terminated liquid polymer having a polyether backbone is the diacrylate ester of the diglycidyl ether of bisphenol A. New caulks and sealants are desired which contain vinylidene-terminated polymers and which cure readily at room temperature without addition of catalysts or crosslinking agents.

SUMMARY OF THE INVENTION

Co-cured compositions are prepared readily from a mixture of 1. 100 parts by weight of at least one amine-terminated liquid polymer containing an average from about 1.7 to about 3 amine groups per molecule, said groups being primary, secondary or a mixture thereof, and said polymer having the formula $$Y-\overset{O}{\overset{\|}{C}}-(B)-\overset{O}{\overset{\|}{C}}-Y$$

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages, and 2. from about 80 to about 120 parts by weight of at least one vinylidene-terminated polymer having the formula $$\underset{\underset{OH}{|}}{\overset{R^5}{\overset{|}{CH_2=C}}}-A-\underset{\underset{|}{|}}{\overset{R^6}{\overset{|}{C}}}-CH_2-Z-(G)-Z-CH_2-\underset{\underset{OH}{|}}{\overset{R^6}{\overset{|}{C}}}-A-\underset{}{\overset{R^5}{\overset{|}{C}}}=CH_2$$

wherein Z is a bivalent radical selected from the group consisting of —S—,

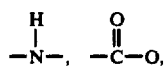

and —O—, A is a bivalent radical containing 1 to 10 atoms of at least one atom selected from the group consisting of C, O, S and N, $R^5$ and $R^6$ are hydrogen or alkyl radicals containing 1 to 4 carbon atoms, and G is a carbon-carbon, polyether or polysulfide polymeric backbone. The vinylidene-terminated liquid polymer may contain an average from about 1.7 to about 3 groups having the formula

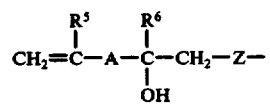

per molecule wherein Z, A, $R^5$ and $R^6$ are as defined heretofore.

DETAILED DESCRIPTION

Amine-Terminated Liquid Polymers.

Amine-terminated liquid polymers suitable for use in this invention have the formula

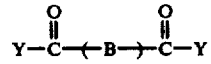

wherein Y is a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages. Generally the carbon-carbon linkages comprise at least about 90% by weight of total polymeric backbone weight, more preferably at least about 95% by weight of total polymeric backbone weight. The amine-terminated polymers contain an average from about 1.7 to about 3 primary and/or secondary amine groups per molecule, more preferably from about 1.7 to about 2.3 primary and/or secondary amine groups per molecule. The amine-terminated polymers may have Brookfield viscosities (measured using a Brookfield RVT viscometer at 27° C) from about 500 cps. to about 2,500,000 cps., more preferably from about 500 cps. to about 500,000 cps.

The amine-terminated liquid polymers can be prepared easily by reacting a carboxyl-terminated or ester-terminated liquid polymer having a carbon-carbon backbone with at least one aliphatic, alicyclic or heterocyclic amine containing at least two primary and/or secondary amine groups. Amine-terminated liquid polymers can also be prepared easily by reacting an acid chloride-terminated liquid polymer having a carbon-carbon backbone with at least one aliphatic, alicyclic, heterocyclic or aromatic amine containing at least two primary and/or secondary amine groups.

The carboxyl-terminated liquid polymers used in this invention may have Brookfield viscosities from about 500 cps. to about 500,000 cps., more preferably from about 500 cps to about 250,000 cps., and have polymeric backbones comprising carbon-carbon linkages. The carboxyl functional groups are located at least at the ends of a polymer molecule, but there may also be additional group(s) located pendant to a polymer backbone. The average number of total carboxyl groups typically is from about 1.7 to about 3 groups per molecule, more preferably from about 1.7 to 2.3 groups per molecule.

Carboxyl-terminated liquid polymers having carbon-carbon backbone linkages may contain polymerized units of at least one vinylidene monomer having at least one terminal CH$_2$=C< group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of allyl radicals containing 1 to 8 carbon atoms such as vinyl methyl ether, allyl methyl ether, and the like; and (e) acrylic acids and acrylates having the formula

wherein R is hydrogen or an alkyl radical containing 1 to 3 carbon atoms and R$^1$ is hydrogen or an alkyl radical containing 1 to 18 carbon atoms, more preferably 1 to 8 carbon atoms, or an alkoxyalkyl, alkylthioalkyl, or cyanoalkyl radical containing 1 to 12 carbon atoms, more preferably 2 to 8 carbon atoms. Even more preferably R$^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal CH$_2$=C< group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

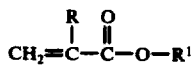

wherein R is hydrogen or an alkyl radical containing 1 to 3 carbon atoms and R$^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably R$^1$ is hydrogen or an alkyl radical containing 1 to 8 carbon atoms. Excellent results were obtained with dienes containing 4 to 10 carbon atoms, more preferably 4 to 8 carbon atoms.

The vinylidene monomers described above are readily polymerized with from 0% to about 50% by weight, more preferably from 0% to about 35% by weight, of at least one comonomer selected from the group consisting of (f) vinyl aromatics having the formula

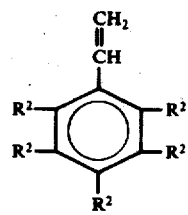

wherein R$^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

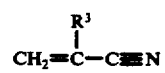

wherein R$^3$ is hydrogen or an alkyl radical containing 1 to 3 carbon atoms, such as acrylonitrile, methacrylonitrile and the like; (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; and (k) allyl alcohol and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

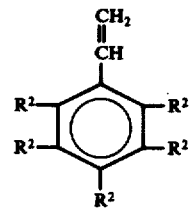

wherein R$^2$ is selected from the group consisting of hydrogen, halogen and alkyl radicals containing 1 to 4 carbon atoms; and (g) vinyl nitriles having the formula

wherein R$^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene, methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and vinyl bromide; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; butyl acrylate and vinyl chloride; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by rection with dicarboxyl compounds or anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene were found to be especially useful. These polymers may contain from about 50% to about 100% by weight of butadiene, from about 0% to about 40% by weight of acrylonitrile or styrene and from about 0.4% to about 10% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted in a distillation column or under reflux in the presence of a small amount of an acid catalyst. Suitable acid catalysts include organic acids containing 1 to 12 carbon atoms, more preferably 1 to 8 carbon atoms, such as acetic acid, propionic acid, benzoic acid, monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C, more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 2-propanol, 1-butanol, 2-hexanol, 3-hexanol, and the like. Other suitable aliphatic monohydric alcohols include 2-methoxyethanol, 2-ethoxyethanol and the like. Excellent results may be obtained using ethanol, 1-propanol or 1-butanol.

The carboxyl-terminated liquid polymers can be acylated by methods well known to the art in order to produce acid chloride-terminated liquid polymers. For example, a carboxyl-terminated polymer can be reacted with thionyl chloride to produce an acid chloride-terminated polymer. HCl and $SO_2$ are evolved primarily as gases and are separated easily from the acid chloride-terminated polymer, and any excess thionyl chloride can be removed easily by vacuum distillation or by washing with a solvent such as methanol. Other suitable but less preferred acylation agents include phosphorus trichloride and phosphorus pentachloride.

Amines which react well with the carboxyl-terminated, ester-terminated and acyl-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably from 4 to 12 carbon atoms, and at least two, more preferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine, and the like; alicyclic diamines and polyamines such as 1,2-diaminocyclohexane, 1,8-p-menthanediamine and the like; and heterocyclic diamines and polyamines such as 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(3-aminopropyl)piperazine, and the like.

More preferably the amines just described contain at least two primary and/or secondary amine groups having different reactivities. The presence of amine groups having different reactivities makes the amine-termination reaction more likely than the coupling of the liquid polymers, and a smaller amine excess is required in order to avoid coupling. Examples of more preferred amines include some alicyclic amines such as 1,8-p-methanediamine and the like; and some heterocyclic amines such as 4-(aminomethyl)piperidine and N-(aminoalkyl)piperazines wherein the alkyl group contains from 1 to 12 carbon atoms, more preferably 1 to 6 carbon atoms, such as N-(2-aminoethyl)piperazine, N-(3-aminopropyl)piperazine, and the like. Excellent results were obtained using N-(2-aminoethyl)piperazine.

Aromatic diamines and polyamines can be used to produce amine-terminated polymers. The high temperature required for aromatic amine reaction with carboxyl-terminated polymers causes excessive degradation of reactants and products and is therefore much less preferred. However, aromatic amines react well with the acyl-terminated polymers described heretofore. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluorenediamine, 1,5-naphthalenediamine, 1,8-naphthalenediamine, 2,4-toluenediamine, 2,6-toluenediamine, o-phenylenediamine, m-phenylenediamine, p-phenylenediamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; halogenated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

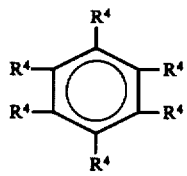

wherein $R^4$ is hydrogen, halogen or an alkyl radical containing 1 to 3 carbon atoms, and at least two $R^4$s are hydrogen. More preferably $R^4$ is hydrogen, chlorine, or an alkyl radical containing 1 to 2 carbon atoms, and at least three $R^4$s are hydrogen. Suitable aromatic solvents include benzene, chlorobenzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid-chloride-terminated liquid polymer described heretofore in order to produce an amine-terminated liquid polymer containing from about 1.7 to about 3 primary and/or secondary amine groups per molecule. Typically the average number of total carboxyl, ester or acid chloride groups in a liquid polymer before reaction will be from about 1.7 to about 3 groups per molecule, more preferably from about 1.7 to about 2.3 groups per molecule. In this typical case, from about 1.2 to about 6 mole equivalents and more, more preferably from about 1.2 to about 3 mole equivalents of at least one amine described heretofore can be used per mole equivalent of carboxylated, esterified or acylated liquid polymer described heretofore. However, when the carboxylated, esterified or acylated liquid polymer also contains polymerized therein appreciable amounts of acrylic acid, acrylates or the like, the amount of amine reacted must be limited so that the amine-terminated liquid polymer contains no more than about 1.7 to about 3 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C to about 150° C, typically for about 1 to 6 hours. The amine-terminated liquid polymer may be purified by vacuum distillation or by washing with a solvent such as a benzene-methanol mixture, followed by drying the polymer. Amine content of the amine-terminated liquid polymers can be analyzed qualitatively by infrared spectroscopy. Amine content can also be analyzed quantitatively following the procedure described by Siggia, *Quantitative Organic Analysis via Functional Groups*, N.Y., Wiley and Sons, Inc., 1963, p. 452–456.

VINYLIDENE-TERMINATED POLYMERS — INTRODUCTION

Vinylidene-terminated polymers suitable for use in this invention may be solids but are preferably liquids having Brookfield viscosities (measured using a Brookfield RVT viscometer at 27° C) from about 400 cps to about 1,000,000 cps, more preferably from about 400 cps to about 500,000 cps. Vinylidene solid polymers may be mixed directly with the amine-terminated liquid polymers described heretofore but are preferably mixed first with at least one solvent or diluent, more preferably a reactive diluent such as styrene, the diglycidyl ether of butanediol and the like. Reactive diluents may cure into the compositions of this invention and thus need not be evaporated or otherwise removed from the compositions. Excellent results were obtained using styrene.

Vinylidene-terminated polymers suitable for use in this invention can be made by several methods. (A) For example, vinylidene-terminated liquid polymers can be prepared by reaction of (1) a liquid polymer having at least terminal functional groups selected from the group consisting of amine, carboxyl, hydroxyl and mercaptan, and (2) a compound containing both an oxirane group

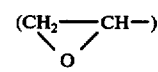

and a vinylidene group. The latter reaction may be catalyzed. (B) Another method of preparing vinylidene-terminated polymers comprises reacting a liquid polymer having at least terminal epoxy groups with acrylic acid or methacrylic acid. For example, a diglycidyl ether of a bisphenol compound can be reacted with acrylic acid or methacrylic acid to form a diacrylate ester; the reaction product contains two terminal vinyl groups per molecule. This reaction can be catalyzed. Thus, it is seen that the method of preparing the vinylidene-terminated polymer is not critical. The essential features of the polymer are that it have at least terminal vinylidene groups and a polymeric backbone comprising carbon-carbon, polyether or polysulfide linkages.

VINYLIDENE-TERMINATED LIQUID POLYMER PREPARATION — METHOD A

The following discussion describes in detail the preparation of vinylidene-terminated liquid polymers by reaction of (1) a liquid polymer having at least terminal functional groups selected from the group consisting of amine, carboxyl, hydroxyl and mercaptan, and (2) a compound containing both an oxirane group

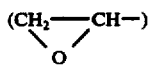

and a vinylidene group. Vinylidene-terminated liquid polymers prepared by the latter method may have the formula

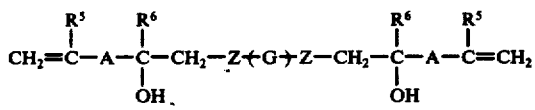

where Z is a bivalent radical selected from the group consisting of

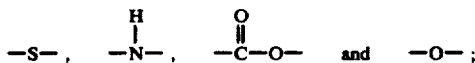

A is a bivalent radical containing 1 to 10 atoms of at least one atom selected from the group consisting of C, O, S and N; and $R^5$ and $R^6$ are hydrogen or alkyl radicals containing 1 to 4 carbon atoms. Z radicals are listed above in decreasing order of preference. The radical Z is the remaining fragment of the amine group of the amine-terminated polymer yielding

the carboxyl group of the carboxyl-terminated polymer yielding

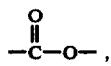

the hydroxyl group of the hydroxyl-terminated polymer yielding —O—, or the mercaptan group of the mercaptan-terminated polymer yielding —S—. The radical A originates from the compound containing both an oxirane group and a vinylidene group and is described more fully hereinafter.

Vinylidene-terminated polymers prepared by the latter method have a theoretical functionality of 2.0 i.e., one group having the formula

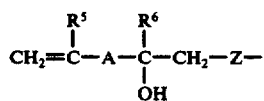

at each end of a polymer molecule. However, the actual average functionality may be from about 1.7 to about 3, more preferably from about 1.7 to about 2.3 of such

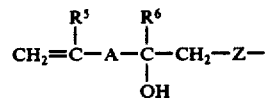

groups per molecule. Thus some of said groups may also be pendant to polymer molecules and are formed by reaction of the oxirane-vinylidene compound with acrylic acid or the like polymerized in the backbone G of the polymer. When the polymeric backbone G contains polymerized therein appreciable amounts of acrylic acid or the like the amount of oxirane-vinylidene compound reacted must be limited so that the vinylidene-terminated polymer contains an average of about 1.7 to about 3

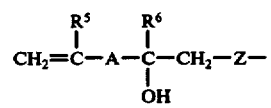

groups per molecule wherein Z, A, $R^5$ and $R^6$ are as defined heretofore. Up to about 50 additional vinylidene groups ($CH_2=C<$) may attach directly or attach via alkylene, alkylidene groups or the like to the polymer backbone.

The polymeric backbone G in the above formula is the polymeric backbone of the functionally-terminated liquid polymer reactant (1) and can have carbon-carbon, polyether or polysulfide linkages. A preferred backbone has carbon-carbon linkages which generally comprise at least about 90% by weight of total polymeric backbone weight, more preferably at least about 95% by weight of total polymeric backbone weight. The carbon-carbon linkages contain polymerized units of at least one vinylidene monomer having at least one terminal $CH_2=C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group. The monomers are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Excellent results were obtained with dienes containing 4 to 10 carbon atoms, more preferably 4 to 8 carbon atoms.

The vinylidene monomers described above are readily polymerized with from 0% up to about 50% by weight, more preferably from 0% to about 30% by weight of at least one comonomer selected from the group consisting of (f) vinyl aromatics having the formula

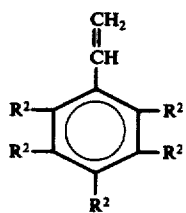

wherein $R^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

wherein $R^3$ is hydrogen or an alkyl radical containing 1 to 3 carbon atoms, such as acrylonitrile, methacrylonitrile and the like; (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; and (k) allyl alcohol and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

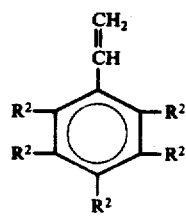

wherein $R^2$ is selected from the group consisting of hydrogen halogen and alkyl radicals containing 1 to 4 carbon atoms; and (g) vinyl nitriles having the formula

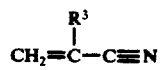

wherein $R^3$ is hydrogen or an alkyl radical containing 1 to 3 carbon atoms.

Examples of useful liquid polymeric backbones comprising carbon-carbon linkages include polyethylene, polyisobutylene, polyisoprene, polybutadiene, poly(vinyl ethyl ether), poly(ethyl acrylate), and poly(butyl acrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and vinyl bromide; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; butyl acrylate and vinyl chloride; and the like.

Preferred amine-terminated liquid polymers for use in preparing vinylidene-terminated liquid polymers have been described heretofore in detail.

Carboxyl-terminated liquid polymers can be prepared by free-radical polymerization using carboxyl-containing initiators and/or modifiers as disclosed in U.S. Pat. No. 3,285,949 and German Pat. No. 1,150,205 and by solution polymerization using lithium metal or organometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, carboxyl-terminated polymers can be prepared from hydroxyl-terminated liquid polymers by reaction with dicarboxyl compounds or anhydrides. Thus it is seen that the method of preparing the carboxyl-terminated liquid polymer is not critical. The essential features of the polymer are that it have at least terminal carboxyl groups and a polymeric backbone comprising carbon-carbon linkages.

Examples of preferred carboxyl-terminated liquid polymers include carboxyl-terminated polyethylene, carboxyl-terminated polyisobutylene, carboxyl-terminated polybutadiene, carboxyl-terminated polyisoprene, carboxyl-terminated poly(ethyl acrylate), as well as carboxyl-terminated copolymers of butadiene and acrylonitrile and of butadiene and styrene. Carboxyl-terminated copolymers of butadiene and acrylonitrile were found to be especially useful. These polymers may contain from about 50% to about 100% by weight of butadiene, from about 0% to about 40% by weight of acrylonitrile, and from about 0.4% to about 10% by weight of carboxyl, based upon total polymer weight.

Hydroxyl-terminated liquid polymers can be prepared by post-reacting carboxyl-terminated polymers as disclosed in U.S. Pat. Nos. 3,551,471 and 3,551,472; by free-radical polymerization of monomers using hydroxyl-containing initiators as disclosed in U.S. Pat. No. 2,344,632; and by solution polymerization using lithium or organometallic catalyst and post-reacting the product to form the hydroxyl groups as disclosed in U.S. Pat. Nos. 3,135,716 and 3,431,235. Thus it is seen that the method of preparing the hydroxyl-terminated liquid polymer is not critical. The essential features of the polymer are that it have at least terminal hydroxyl groups and a polymeric backbone comprising carbon-carbon linkages. Examples of preferred hydroxyl-terminated liquid polymers include hydroxyl-terminated polyethylene, hydroxyl-terminated polyisobutylene, hydroxyl-terminated polybutadiene, hydroxyl-terminated polyisoprene, hydroxyl-terminated (ethyl acrylate), as well as hydroxyl-terminated copolymers of butadiene and acrylonitrile and of butadiene and styrene.

Mercaptan-terminated liquid polymers can be prepared by free-radical polymerization of monomers in the presence of dixanthogen disulfide followed by post-reaction to form mercaptan groups as disclosed in U.S. Pat. Nos. 3,449,301 and 3,580,830. Examples of preferred mercaptan-terminated liquid polymers include mercaptan-terminated polyethylene, mercaptan-terminated polyisobutylene, mercaptan-terminated polybutadiene, mercaptan-terminated polyisoprene, mercaptan-terminated poly(ethyl acrylate), as well as mercaptan-terminated copolymers of butadiene and acrylonitrile and of butadiene and styrene.

The liquid polymer reactants can contain more than one type of functional group. For example, the polymers can have terminal carboxyl groups and internal pendant epoxy groups derived from interpolymerized units of glycidyl acrylate monomer; or, the polymers can contain terminal mercaptan groups and internal pendant carboxyl groups derived from interpolymerized units of acrylic acid.

Suitable oxirane-vinylidene compounds for use in preparing the vinylidene-terminated polymers of this invention have the formula

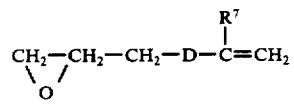

wherein $R^7$ is hydrogen or an alkyl radical containing from 1 to 4 carbon atoms, more preferably hydrogen or methyl, and A is a bivalent radical containing from 1 to 10 atoms of at least one atom selected from the group consisting of C, O, S and N. More preferably the compound contains a glycidyl radical and has the formula

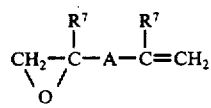

wherein $R^7$ is hydrogen or a methyl radical, and D is a bivalent radical containing from 1 to 9 atoms of at least one atom selected from the group consisting of C, O, S, and N, more preferably 1 to 4 atoms of carbon and/or oxygen. Examples of more preferred compounds include isopropenyl glycidyl ether, allyl glycidyl ether, methallyl glycidyl ether, glycidyl acrylate and glycidyl methacrylate. Even more preferred are glycidyl acrylate and glycidyl methacrylate. D is —O— when the oxirane-vinylidene compound is isopropenyl glycidyl ether, —CH$_2$—O— when the oxirane-vinylidene compound is allyl glycidyl ether or methallyl glycidyl ether, and

when the oxirane-vinylidene compound is glycidyl acrylate or glycidyl methacrylate.

Carboxyl-terminated polymers described heretofore were found to be excellent polymer reactants for the reaction with the compound containing both an oxirane group and a vinylidene group. The carboxyl-terminated liquid polymers have an average carboxyl functionality from about 1.7 to about 3, more preferably from about 1.7 to about 2.3. Thus some carboxyl groups may also be pendant to polymer molecules. The average carboxyl functionality can be determined by multiplying the polymer molecular weight by the equivalent parts per hundred of carboxyl groups (ephr). Molecular weight can be measured using a Mechrolab Vapor Pressure Osmometer. The equivalent parts per hundred of carboxyl groups is determined by measuring the weight percent of carboxyl groups in the polymer (by titration of a polymer solution to a phenolphthalein end-point using alcoholic KOH) and dividing the resultant figure by 45, the gram molecular weight of a carboxyl group (—COOH). The carboxyl terminated liquid polymers may have molecular weights from about 1000 to about 6000, more preferably from about 2000 to about 5000. The carboxyl-terminated liquid polymers may have Brookfield viscosities (measured using a Brookfield RVT viscometer at 27° C) from about 500 cps to about 500,000 cps.

The carboxyl-terminated liquid polymers can be reacted with a compound containing both an oxirane group and a vinylidene group at a ratio from about 1 to about 3 equivalents and more of epoxy per equivalent of carboxyl. However, use of more than 3 equivalents of epoxy per equivalent of carboxyl is unnecessary to achieve excellent results.

The reaction can be conducted in bulk, preferably employing an excess of the oxirane-vinylidene compound. More preferably the reaction is conducted in a solvent. Solvent choice is influenced by solubility of the specific functionally-terminated liquid polymer used. Examples of useful solvents include aliphatic ketones and ethers such as acetone, methylethyl ketone, tetrahydrofuran and the like. More preferred are chlorinated hydrocarbons such as chloroform and aromatic solvents such as benzene, toluene, xylene and the like. Benzene was found to be an excellent solvent for a variety of the functionally terminated liquid polymers described heretofore.

Reaction temperature can be from about 0° C to about 200° C, more preferably from about 50° C to about 150° C. Total reaction time varies directly with temperature and catalyst amount but is generally from about 4 hours to about 24 hours. Preferably the reaction is conducted in the absence of air or oxygen.

The carboxyl-oxirane reaction rate can be accelerated by use of a catalyst in an amount from about 0.05 to about 2 weight parts, more preferably from about 0.1 to about 1 weight part, of catalyst per 100 weight parts of functionally-terminated liquid polymer reactant. Suitable catalysts include triphenylphosphine, p-toluenesulfonic acid and the like.

VINYLIDENE-TERMINATED POLYMER PREPARATION — METHOD B

The following discussion describes the preparation of vinylidene-terminated polymers by reaction of (1) a diglycidyl ether of a bisphenol compound having the formula

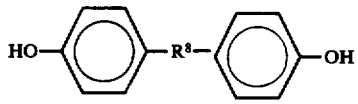

wherein $R^8$ is a bivalent radical containing 1 to 8 atoms of at least one atom selected from the group consisting of C, O, S, and N, more preferably an alkylene or alkylidene group containing 1 to 8 carbon atoms, and even more preferably an alkylene or alkylidene group containing 1 to 6 carbon atoms, and (2) acrylic acid or methacrylic acid. Examples of suitable bisphenols include methylene bisphenol, isopropylidene bisphenol, butylidene bisphenol, octylidene bisphenol, bisphenol sulfide, bisphenol sulfone, bisphenol ether, and the like. Excellent results were obtained using isopropylidene bisphenol (bisphenol A).

Vinylidene-terminated polymers prepared by the latter method are preferred examples of polymers of the formula given heretofore:

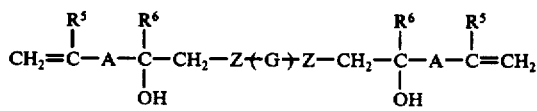

wherein X is —O—, A is

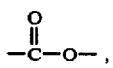

$R^5$ is hydrogen or methyl, $R^6$ is hydrogen, and the polymeric backbone G is the polyether residue of the diglycidyl ether of a bisphenol and has the formula

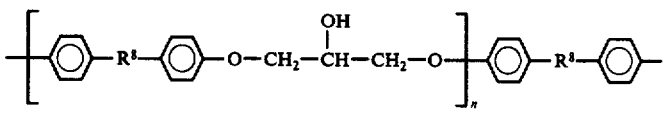

wherein $R^8$ is as defined heretofore and n is from 0 to 20, more preferably from about 0 to 2. In other words, vinylidene-terminated polymers prepared by the method just described may have the formula

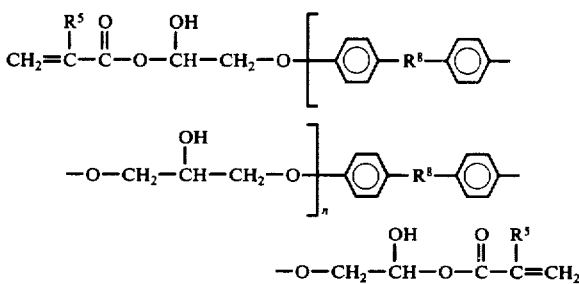

wherein $R^5$ is hydrogen or methyl and $R^8$ and n are as defined heretofore.

The vinylidene-terminated polymers used in this invention have highly reactive terminal vinylidene groups. Therefore, preferably they are mixed with an antioxidant to hinder premature oxidation. The antioxidant is used in a range from about 0.1 to about 5 parts, more preferably from about 0.5 to 2 parts by weight per 100 parts by weight of polymer. Suitable antioxidants include phenyl-β-naphthylamine, di-β-naphthyl-p-phenylenediamine, 2,6-di-t-butyl paracresol, 2,4,6-trihexyl phenol, 1,3,5-tris-(3,5-di-t-butyl-4-hydroxybenzyl)isocyanurate and the like.

CO-CURED COMPOSITIONS

Co-cured compositions can be prepared readily from a mixture of (1) 100 parts by weight of at least one amine-terminated liquid polymer described heretofore and (2) from about 80 to about 120 parts by weight, more preferably from about 90 to about 110 parts by weight, of at least one vinylidene-terminated polymer described heretofore. The compositions cure readily at room temperature without addition of catalysts or crosslinking agents. Thus a desired high backbone weight concentration can be obtained without dilution by unnecessary reactive third components and also without undesirable side reactions caused by some catalyst residues or crosslinkers. The novel compositions of this invention are useful as caulks, sealants, potting compounds and the like.

In addition to the two essential components (an amine-terminated liquid polymer and a vinylidene-terminated polymer) described heretofore, the co-cured compositions may contain a broad range of other compounding ingredients. These ingredients are typical ingredients used in caulk and sealant compounding. Standard levels of these ingredients are used, such levels being well known in the art. A preferred limitation placed on the levels of compounding ingredients is that compositions containing them should be flowable without substantial sagging at temperatures ranging from about 20° C to about 100° C. This generally limits the amount of reinforcing fillers and other ingredients which thicken the liquid composition to low levels of up to about 50 parts by weight at room temperature per 100 parts by weight of co-cured composition. If a plasticizer such as dioctyl phthalate or the like is used, even higher amounts of compounding ingredients can be used. The composition components can be mixed using mixing kettles, Henschel mixers, ink mills, Banbury mixers or the like. Standard mixing techniques can be used, and no particular addition order is required.

Examples of compounding ingredients include reinforcing fillers such as carbon blacks, metal carbonates and silicates, and glass, asbestos, and textile fibers; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-$\beta$-naphthylamine, 2,6-di-t-butyl paracresol, 2,2'methylenebis-(4-ethyl-6-t-butyl phenol), 2,2'-thiobis-(4-methyl-6-t-butylphenol), 4,4'-butylidenebis-(6-t-butyl-m-cresol), tris-(3,5-di-t-butyl-4-hydroxybenzyl)isocyanurate, hexahydro-1,3,5-tris-$\beta$-(3,5-di-t-butyl-4-hydroxyphenyl)-propionyl triazine, tetrakis-methylene-3(3',5'-di-t-butyl-4'- hydroxyphenyl)propionate methane, distearyl thiodipropionate, tri(nonylated phenyl) phosphite, and the like.

The following examples illustrate the present invention more fully.

EXAMPLES

Materials

The amine-terminated and vinylidene-terminated polymers used in the following examples were prepared readily by following th procedures described in detail heretofore. The liquid polymers used were as follows:

(1) An amine-terminated liquid poly(butadiene/acrylonitile), identified as ATBN, had a butadiene content of about 67.2% by weight of polymer, an acrylonitrile content of about 16.4% by weight of polymer, and an amine end group content of about 13.4% by weight of polymer, and had a Brookfield viscosity at 27° C of about 270,000 cps and a molecular weight of ($m_{\overline{n}}$) of about 3,556. The ATBN was made by reacting N-(2-aminoethyl)piperazine in an amine termination reaction with a carboxyl-terminated liquid polymer by a method described heretofore.

(2) A vinylidene-terminated poly(butadiene/acrylonitrile), identified as VTBN, had a butadiene content of about 69.5% by weight of polymer, an acrylonitrile content of abut 16.2% by weight of polymer, and a vinylidene end-group content of about 14.3% by weight of polymer, and had a Brookfield viscosity at 27° C of about 320,000 cps and a molecular weight ($M_{\overline{n}}$) of about 3,556. The VTBN was made by reacting glycidyl acrylate with a carboxyl-terminated liquid polymer according to Method B described heretofore.

(3) A diacrylate ester of the diglycidyl ether of bisphenol A was used. The diacrylate ester is identified hereafter as Compound D and was used as a 55 wt.% solution in styrene, the solution having a viscosity of about 500 cps and a specific gravity of about 1.04.

All other compounding ingredients used in the following examples are known commercial materials and are readily available.

EXAMPLE I

The following recipe was used:

| Material | Wt. Parts |
| --- | --- |
| ATBN | 50 |

-continued

| Material | Wt. Parts |
| --- | --- |
| VTBN | 50 |
| Dioctyl Phthalate | 50 |

The novel co-cured composition was prepared as follows. All materials was placed in a 19 oz. #2 can and stirred vigorously with a spatula for 3 – 5 minutes at room temperature (about 25° C). The mixture was poured thereafter into a Teflon-coated pan and allowed to cure at room temperature. A soft cure suitable for sealant compositions was attained in about 17 days depending upon compounding additives used. Samples were removed from the pan at that time and tested immediately.

The composition was tested for Durometer hardness using a Shore Type "A" durometer and a 10-second indentation hardness time interval. 300% modulus, tensile strength and ultimate elongation were determined according to ASTM D412-68 using Die C dumbbells. Percent set was tested at 25° C by stretching a ⅛ × ¼ × 3 sample to 200% elongation and holding there for 2 minutes, and thereafter releasing and allowing the sample to rest for 2 minutes before testing. Test results are set forth in Table I.

TABLE I

| TEST | RESULTS |
| --- | --- |
| Durometer "A" Hardness (instantaneous/10 sec) | 5/0 |
| % Ultimate Elongation at 25° C | 1100% |
| % Set | 25 |

The physical testing data indicates that the co-cured composition of this invention has a good balance of physical properties making it suitable for caulk and sealant applications.

EXAMPLE 2

The following two-part recipe was used:

| MATERIAL | WT. PARTS Recipe #1 | Recipe #2 |
| --- | --- | --- |
| ATBN | 50 | — |
| VTBN | — | 50 |
| Dioctyl Phthalate | 25 | 25 |
| Calcium Carbonate Powder | 130 | 130 |
| Thickening Agent | 10 | 10 |

Each of the above batches was mixed separately by stirring vigorously with a spatula for 3 minutes. Immediately thereafter both batches were placed in a 19 oz. #2 can and stirred vigorously for 3 – 5 minutes at room temperature. The composition was tested for Durometer hardness using a Shore Type "A" durometer and a 10 second indentation hardness time interval. Durometer A hardness was found to be 6/0 (instantaneous/10 seconds) and 12/0 (instantaneous/10 seconds) after 2 and 7 days respectively. The co-cured composition developed a soft, tacky cure between 3 and 16 hours after mixing and was suitable for caulk and sealant applications.

EXAMPLE 3

| MATERIAL | WT. PARTS |
| --- | --- |
| ATBN | 60 |
| Compound D (55.wt.% solution | |

| MATERIAL | WT. PARTS |
|---|---|
| in styrene) | 100* |

*Total weight of Compound D and styrene

The novel co-cured compositions were prepared as follows. Both materials were placed in a 19 oz. #2 can and stirred vigorously with a spatula for 10 minutes at room temperature (about 25° C). The mixed sample was divided into two portions, and each portion was poured into a separate pan. One portion was cured for about 48 hours at room temperature and developed a soft, tacky cure suitable for use as a potting, sealant, or caulking compound. A second portion was cured first at 70° C for 2 hours and thereafter at 120° C for 2 hours, resulting in a cheesy rubber having a non-tacky surface.

I claim:
1. A composition comprising
   1. 100 parts by weight of at least one amineterminated liquid polymer containing an average from about 1.7 to about 3 amine groups per molecule, said groups being primary, secondary or a mixture thereof, and said polymer having the formula

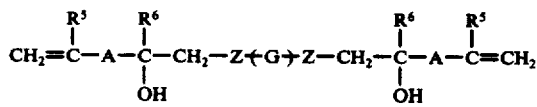

wherein Y is a univalent radical obtained by removing hydrogen from an amine group of a heterocyclic amine containing from 2 to 20 carbon atoms and at least two amine groups, at least two of said amine groups being primary, secondary, or a mixture thereof, and B is a polymeric backbone comprising carbon-carbonlinkages, and
   2. from about 80 to about 120 parts by weight of at least one vinylidene-terminated liquid polymer having the formula $$CH_2=C-A-C-CH_2-Z(G)Z-CH_2-C-A-C=CH_2$$
$$\overset{|}{R^5} \quad \overset{|}{R^6} \quad \quad \overset{|}{R^6} \quad \overset{|}{R^5}$$
$$\quad \quad \overset{|}{OH} \quad \quad \quad \quad \overset{|}{OH}$$

wherein Z is selected from the group consisting of
—S—,

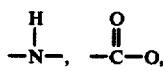

and —O—, A is a bivalent radical containing 1 to 10 atoms of at least one atom selected from the group consisting of C, O, S and N, $R^5$ and $R^6$ are hydrogen or alkyl radicals containing 1 to 4 carbon atoms, and G is a polymeric backbone comprising carbon-carbon linkages, said vinylidene-terminated polymer containing an average from about 1.7 to about 3

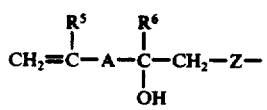

groups per molecule,
wherein said backbone comprising carbon-carbon linkages contains polymerized units of at least one vinylidene monomer having at least one terminal $CH_2=C<$ group said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (3) acrylic acids and acrylates having the formula

said R being hydrogen or an alkyl radical containing 1 to 3 carbon atoms and said $R^1$ being hydrogen, an alkyl radical containing 1 to 18 carbon atoms, or an alkoxyalkyl, alkylthioalkyl or cyanoalkyl radical containing 2 to 12 carbon atoms.

2. A composition of claim 1 wherein said carbon-carbon linkages comprise at least 90% by weight of total polymeric backbone weight, and said vinylidene monomer is selected from the group consisting of (a) monoolefins containing 2 to 8 carbon atoms, (b) dienes containing 4 to 8 carbon atoms, and (e) acrylic acids and acrylates having the formula

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A composition of claim 2 wherein said vinylidene monomer contains copolymerized therewith up to about 50% by weight of at least one comonomer selected from the group consisting of (f) vinyl aromatics having the formula

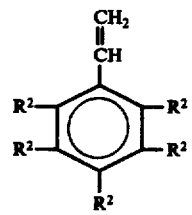

wherein $R^2$ is hydrogen, halogen or an alkyl radical containing from 1 to 4 carbon atoms, (g) vinyl nitriles having the formula

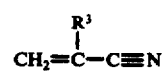

wherein $R^3$ is hydrogen or an alkyl radical containing 1 to 3 carbon atoms, (h) vinyl halides, (i) divinyls and diacrylates, (j) amides of α, β-olefinically unsaturated carboxylic acids containing 2 to 8 carbon atoms, and (k) allyl alcohol.

4. A composition of claim 3 wherein said amine groups of said amine have different reactivities, and said comonomer is selected from the group consisting of (f) said vinyl aromatics and (g) said vinyl nitriles.

5. A composition of claim 4 wherein said amine is at least one N-(aminoalkyl)piperazine, the aminoalkyl group of said amine contains from 1 to 12 carbon atoms, said vinylidene monomer is at least one of said dienes, and said comonomer is at least one of said vinyl nitriles.

6. A composition of claim 5 wherein said amine is N-(2-aminoethyl)piperazine, said vinylidene monomer is butadiene and said comonomer is acrylonitrile.

7. A composition of claim 5 wherein the amine-terminated polymer (1) has a Brookfield viscosity at 27° C of about 500 to about 500,000 cps, the carbon-carbon backbone B is derived from butadiene or alkyl acrylates, $R_1$ in said alkyl acrylates is an alkyl radical containing 1 to 8 carbon atoms, said amine is at least one N-(aminoalkyl)piperazine, the aminoalkyl group of said amine contains from 1 to 6 carbon atoms, and wherein the vinylidene-terminated polymer (2) has a Brookfield viscosity at 27° C from about 400 to about 500,000 cps, the carbon-carbon backbone G is derived from butadiene or alkyl acrylates, and $R_1$ in said acrylates is an alkyl radical containing 1 to 8 carbon atoms.

8. A composition of claim 7 wherein said amine-terminated polymer (1) is an amine-terminated polymer of butadiene and acrylonitrile and said amine is N-(aminoethyl)piperazine, and wherein said vinylidene-terminated polymer (2) is a vinylidene-terminated polymer of butadiene and acrylonitrile, said acrylonitrile being present in amounts up to about 40% by weight of acrylonitrile in each of said polymers (1) and (2).

9. A cured composition of claim 1.

10. A co-cured composition of claim 7.

11. A co-cured composition of claim 8.

12. A process comprising reacting
1. 100 parts by weight of at least one amine-terminated liquid polymer containing from about 1.7 to about 3 amine groups per molecule, said groups being primary, secondary or a mixture thereof, and said polymer having the formula

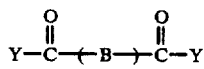

wherein Y is a univalent radical obtained by removing hydrogen from an amine group of a heterocyclic amine containing from 2 to 20 carbon atoms and at least two amine groups, said amine groups being primary, secondary or a mixture thereof, and B is a polymeric backbone comprising carbon-carbon linkages, and 2. from about 80 to about 120 parts by weight of at least one vinylidene-terminated liquid polymer having the formula

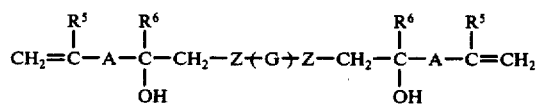

wherein Z is selected from the group consisting of —S—, —N—,

and —O—, A is a bivalent radical containing 1 to 10 atoms of at least one atom selected from the group consisting of C, O, S and N, $R^5$ and $R^6$ are hydrogen or alkyl radicals containing 1 to 4 carbon atoms, and G is a polymeric backbone comprising carbon-carbon linkages, said vinylidene-terminated polymer containing an average from about 1.7 to about 3

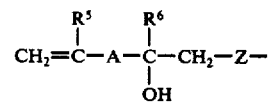

groups per molecule,
wherein said backbone comprising carbon-carbon linkage contains polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

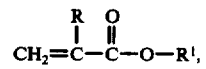

said R being hydrogen or an alkyl radical containing 1 to 3 carbon atoms and said $R^1$ being hydrogen, an alkyl radical containing 1 to 18 carbon atoms, or an alkoxyalkyl, alkylthioalkyl or cyanoalkyl radical containing 2 to 12 carbon atoms.

* * * * *